United States Patent
Sinclair

(10) Patent No.: US 9,870,153 B2
(45) Date of Patent: Jan. 16, 2018

(54) NON-VOLATILE MEMORY SYSTEMS UTILIZING STORAGE ADDRESS TABLES

(71) Applicant: SanDisk Technologies Inc., Plano, TX (US)

(72) Inventor: Alan Welsh Sinclair, Falkirk (GB)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/584,315

(22) Filed: Dec. 29, 2014

(65) Prior Publication Data

US 2016/0188206 A1 Jun. 30, 2016

(51) Int. Cl.
*G06F 12/00* (2006.01)
*G06F 3/06* (2006.01)
*G06F 12/02* (2006.01)

(52) U.S. Cl.
CPC ............ *G06F 3/061* (2013.01); *G06F 3/0659* (2013.01); *G06F 3/0688* (2013.01); *G06F 12/0246* (2013.01); *G06F 12/0253* (2013.01); *G06F 2212/702* (2013.01); *G06F 2212/7201* (2013.01)

(58) Field of Classification Search
CPC ............ G06F 12/0246; G06F 12/0253; G06F 2212/7201; G06F 2212/702; G06F 3/061; G06F 3/0659; G06F 3/0688
See application file for complete search history.

(56) References Cited

U.S. PATENT DOCUMENTS

| | | | | |
|---|---|---|---|---|
| 7,913,032 B1* | 3/2011 | Cornwell | ............ | G06F 12/0246 711/103 |
| 8,769,190 B1* | 7/2014 | Syu | ......... | G06F 3/061 711/103 |
| 9,218,283 B2* | 12/2015 | Gorobets | ............ | G06F 12/0246 |
| 2011/0072195 A1* | 3/2011 | Lin | ...... | G06F 12/0246 711/103 |
| 2011/0202690 A1* | 8/2011 | Chu | ....... | G06F 1/3203 710/14 |
| 2013/0290611 A1* | 10/2013 | Biederman | ............ | G11C 16/30 711/103 |
| 2014/0185376 A1* | 7/2014 | Sinclair | ................. | G11C 16/10 365/185.03 |
| 2014/0189200 A1* | 7/2014 | Gavens | ............... | G06F 12/0607 711/103 |

* cited by examiner

*Primary Examiner* — Kalpit Parikh
(74) *Attorney, Agent, or Firm* — Brinks Gilson & Lione

(57) ABSTRACT

Non-volatile memory systems utilizing storage address tables are disclosed. A non-volatile memory system may include a non-volatile memory, a memory die command manager in communication with the memory, and a command manager in communication with the memory die command manager. The memory die command manager is configured to identify a free die of the memory to store data, where the free die of the memory is identified independent of a host logical block address associated with the data; store the data at a physical block address at the free die; and generate an entry in a first address table, the first address table associating the physical block address with a virtual logical block address. The command manager is configured to generate an entry in a second address table, the second address table associating the virtual logical block address with a host logical block address received with the host write command.

20 Claims, 8 Drawing Sheets

NON-VOLATILE MEMORY SYSTEMS UTILIZING STORAGE ADDRESS TABLES

BACKGROUND

Host systems often send commands to non-volatile memory systems that are associated with logical block addresses. The memory system maps the logical block addresses received with the commands to physical block addresses at the memory system. Typically, the memory system maps logical block addresses in a subset of logical address space exclusively to a subset of physical address space at the memory system known as a bank. Because of this, new commands that a host system may desire to send to a memory system may be blocked.

In one example, the blockage may occur when one or more banks of memory within the memory system operate more slowly than other banks of memory because of an asymmetrical host workload or extensive maintenance operations. In another example, blockage may occur when host command queues become full with pending commands for one or more slow banks of memory within the memory system. With some host protocols such as Native Command Queuing (NCQ), a number of outstanding commands in a host command queue, which is known a queue depth, is restricted to a maximum value. When the host command queue reaches this maximum value, the memory system is prevented from receiving further commands from the host, thereby blocking receipt of commands for the banks of memory that may be idle.

Improved non-volatile memory systems are desirable that minimize the blockage of host commands to memory systems.

SUMMARY

In one aspect, a non-volatile memory system is disclosed. The system includes a non-volatile memory, a memory die command manager in communication with the non-volatile memory, and a command manager in communication with the memory die command manager.

The memory die command manager is configured to identify a free die of the non-volatile memory to store data, where the free die of the non-volatile memory is identified independent of a host logical block address associated with the data; store the data at a physical block address at the free die; and generate an entry in a first address table, the first address table associating the physical block address with a virtual logical block address.

The command manager is configured to generate an entry in a second address table, the second address table associating the virtual logical block address with a host logical block address received with the host write command.

In another aspect, a method is disclosed. The elements of the method occur in a non-volatile memory system comprising a non-volatile memory, a memory die command manager in operative communication with the non-volatile memory, and a command manager in operative communication with the memory die command manager.

In the method, the command manager receives a host write command associated with data, where the host write command is associated with a host logical block address. The command manager buffers the data and communicates a command request to the memory die command manager, the command request comprising a size and location of the buffered data.

The memory die command manager identifies a free die and stores the buffered data at a physical block address at the free die. The memory die command manager generates an entry in a first address table, the first address table containing the physical block address associated with a virtual logical block address.

The memory die command manager communicates the virtual logical block address to the command manager and the command manger generates an entry in a second address table, the entry in the second address table associating the virtual logical block address with the host logical block address.

In a further aspect, another non-volatile memory system is disclosed. The non-volatile memory system includes non-volatile memory and a controller in communication with the non-volatile memory.

The controller comprises a first module and a second module in communication with the first module. The first module is configured to identify a free die of the non-volatile memory to store data, where the free die of the non-volatile memory is identified independent of a host logical block address associated with the data. The first module is further configured to generate an entry in a first address table, the first address table associating a physical block address where the data is stored with a virtual logical block address.

The second module is configured to generate an entry in a second address table, the second address table associating the virtual logical block address with a host logical block address for the data received with a host write command.

DETAILED DESCRIPTION

The present disclosure is directed to non-volatile memory systems utilizing storage address tables. The described non-volatile memory systems may minimize blockage of host commands to memory systems by assigning logical address units that a host uses with host commands to physical block addresses at any die in memory within the memory system that is free for processing of the command. By assigning logical address units to physical block addresses at any die rather than assigning logical address units exclusively to a subset of physical address space at the memory system known as a bank, host commands do not accumulate in buffers waiting for a busy bank of memory to become idle.

As described in more detail below, a non-volatile memory system may utilize two or more storage address tables in order to assign logical address units to physical address units at any die during operation. A first storage address table associates physical block addresses at a specific die of memory with virtual logical block address and a second storage address table associates virtual logical block addresses with host logical block addresses.

During operation, a command manager and one or more memory die command managers may perform operations to store data at a die of the memory based on the availability of the die of memory. Because memory die command managers may dynamically assign a physical block address at a specific die of memory to a virtual logical block address, the memory system may perform the storage operation more efficiently without waiting for a specific die to become available.

Additionally, during operation the command manager and memory die command managers may perform operations to modify data already stored at a die of the memory based on the availability of the die of memory. The memory die command managers may modify entries in the storage address table associating physical block addresses at specific die of memory with virtual logical block addresses, but because the virtual logical block information associated with the data may not change, the command manager does not need to modify entries in the storage address table associating virtual logical block addresses with host logical block addresses.

As explained in more detail below, these types of operations prevent an accumulation of host commands in buffers, thereby minimizing access blockage to the memory system.

Figure 1A:
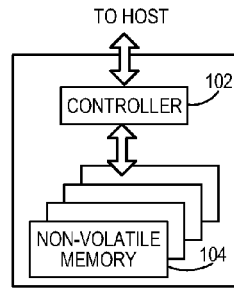
FIG. 1A is a block diagram of an example non-volatile memory system.

FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
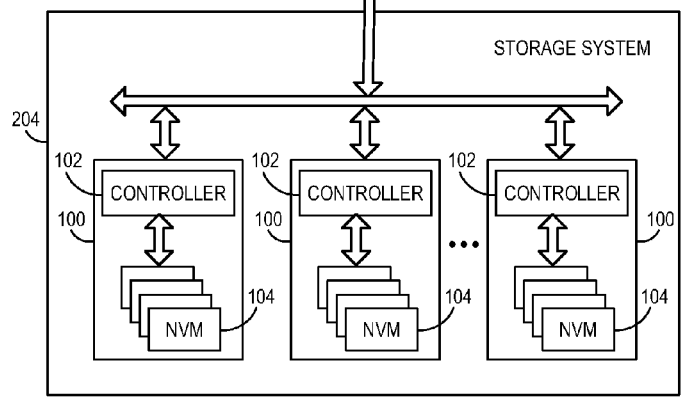
FIG. 1B is a block diagram illustrating an exemplary storage module.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
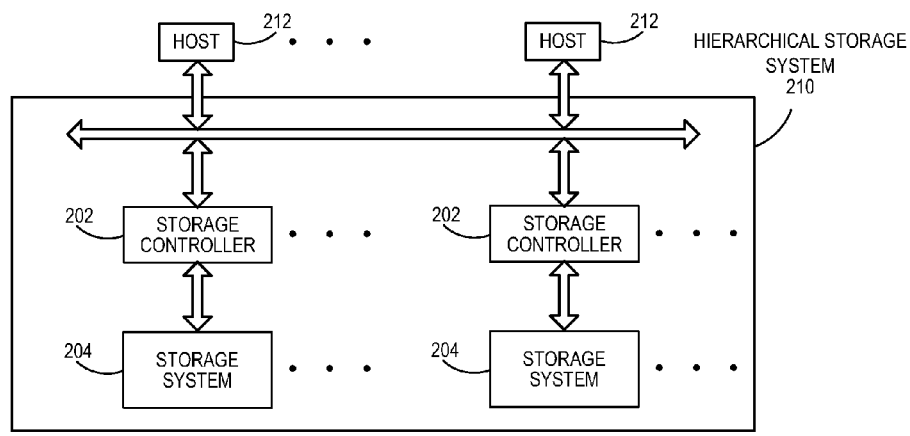
FIG. 1C is a block diagram illustrating a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
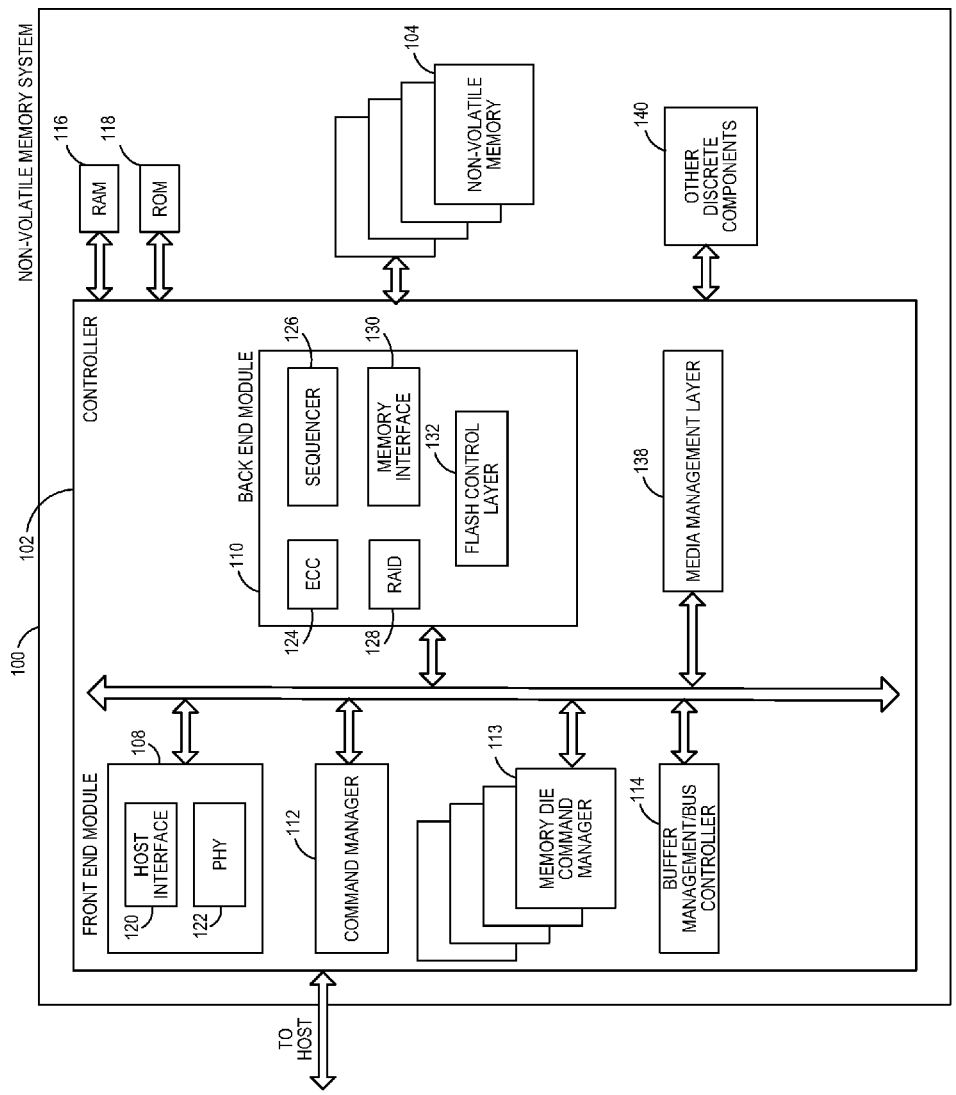
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a command manager module 112 and memory die command manager modules 113 present on the die of the controller 102. As explained in more detail below in conjunction with FIGS. 5-8, the command manager 112 and one or more memory die command managers 113 may perform operations to store data at a die of the memory 104 based on the availability of the die of memory. Because memory die command managers 113 may dynamically assign a physical block address at a specific die 104 of memory to a virtual logical block address, the memory system 100 may perform the storage operation more efficiently without waiting for a specific memory die to become available.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
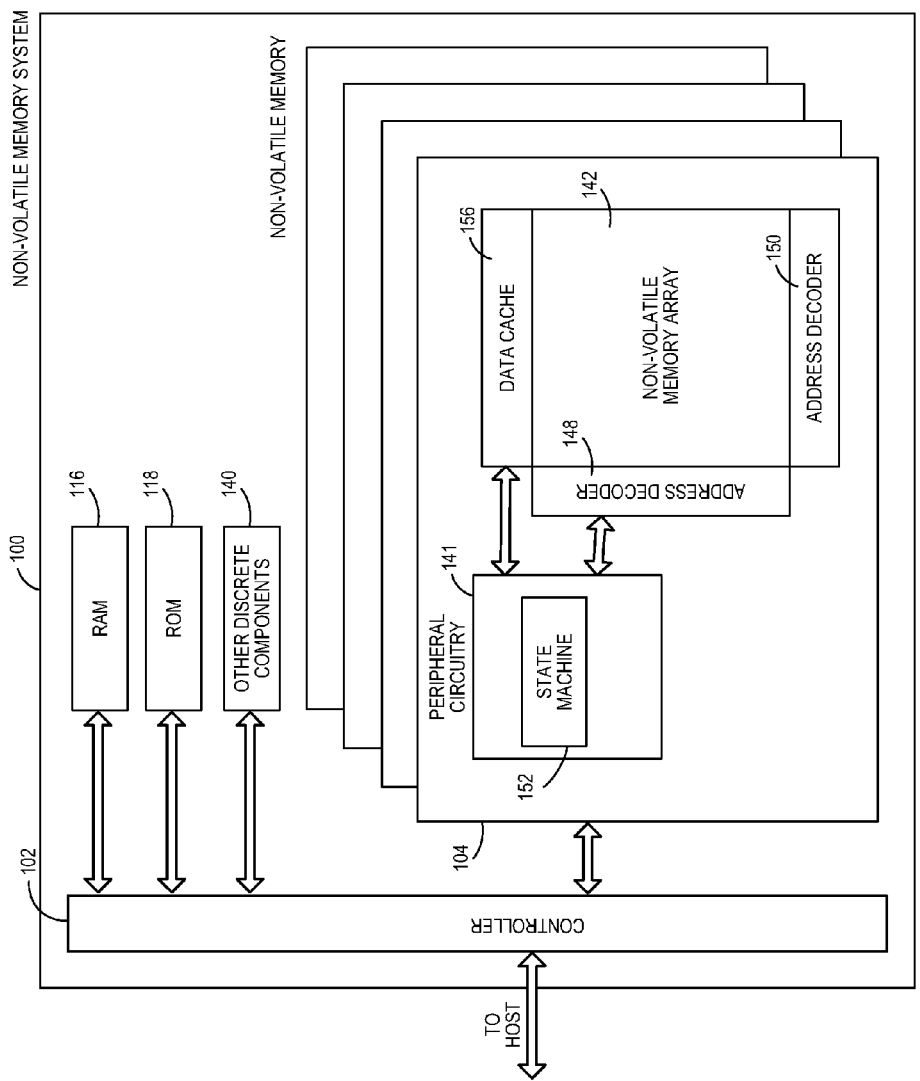
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
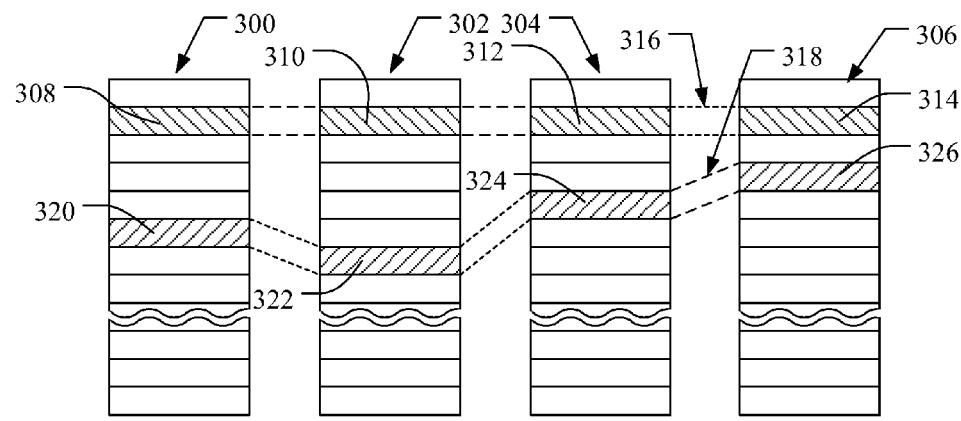
FIG. 3 illustrates an example physical memory organization.

Non-volatile memory may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
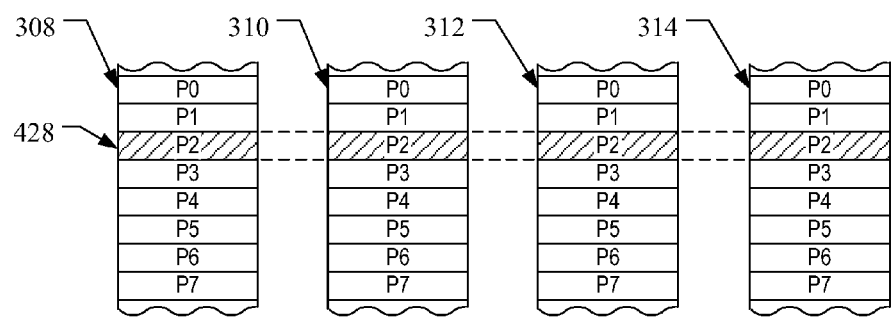
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312, and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 428 is illustrated in FIG. 4 as formed of one physical page for each of the four blocks 308, 310, 312 and 314. The metapage 428 includes the page P2 in each of the four blocks but the pages of a metapage need not necessarily have the same relative position within each of the blocks. A metapage is the maximum unit of programming. The blocks disclosed in FIGS. 3 and 4 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host. The LBAs are then mapped to one or more physical blocks in the non-volatile memory system 100 where the data is physically stored.

Figure 5:
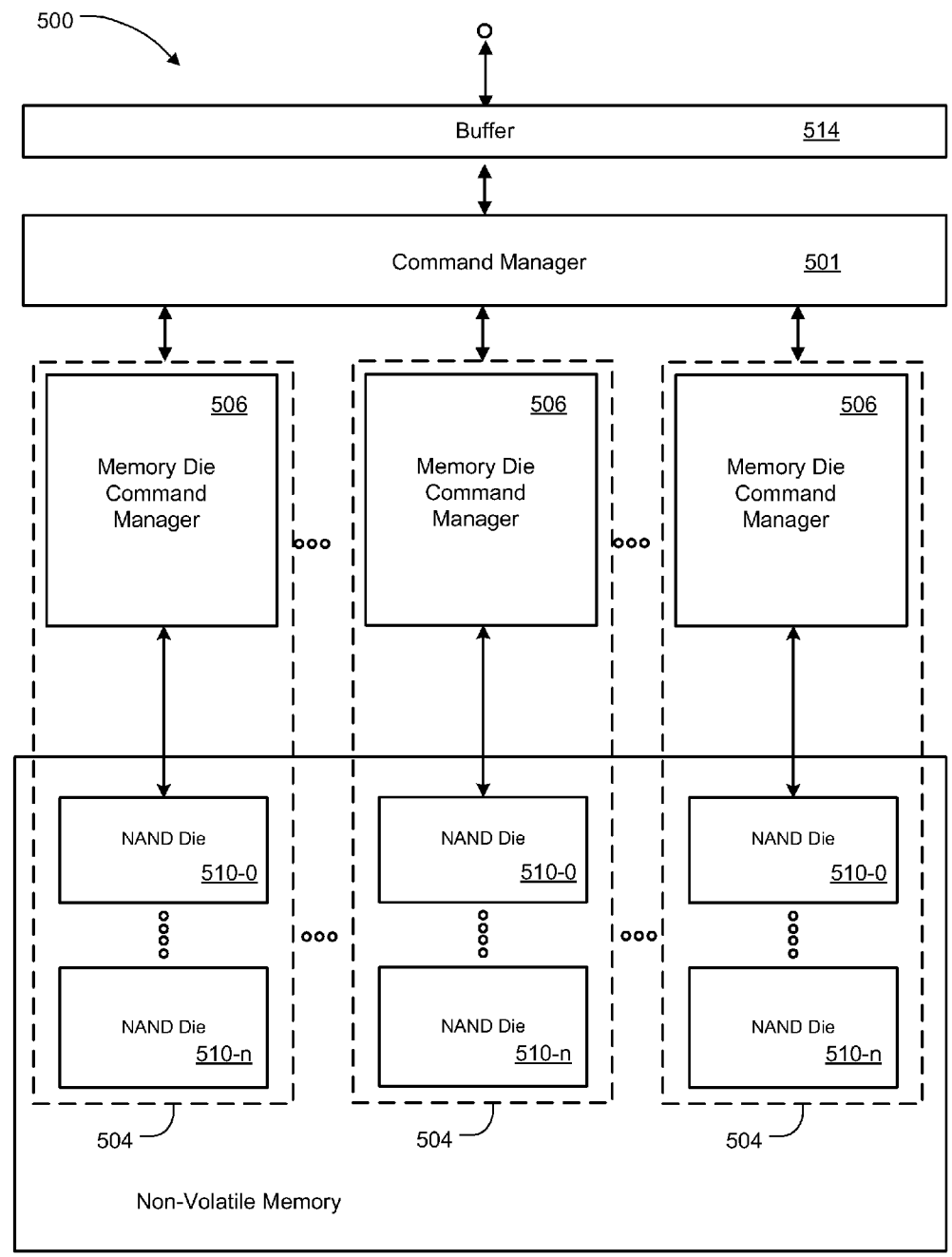
FIG. 5 illustrates an arrangement of a non-volatile memory system with a memory array and multiple memory die command managers.
Figure 6:
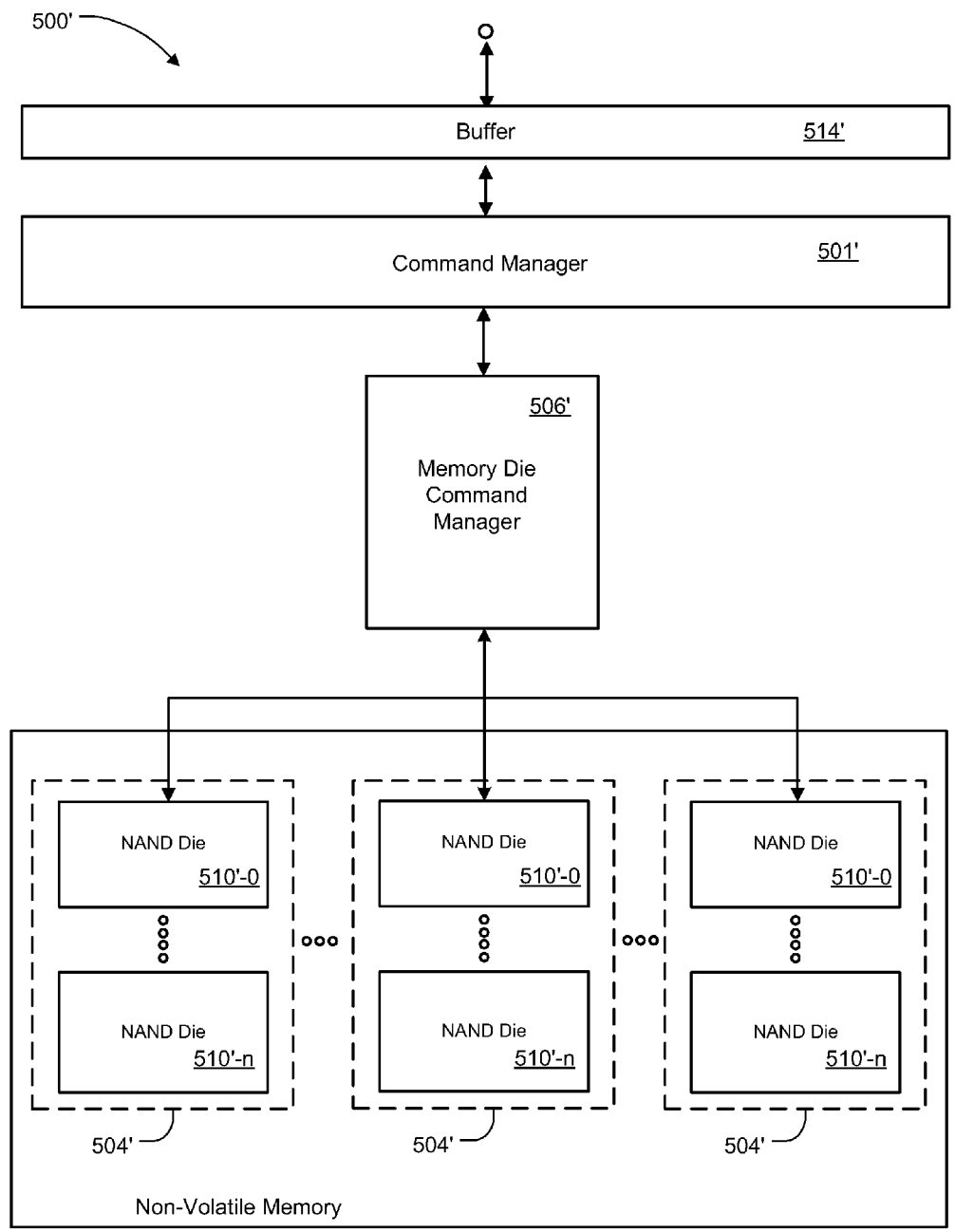
FIG. 6 illustrates an alternative arrangement of a non-volatile memory system with a memory array and a single memory die command manager.

As shown in FIGS. 5 and 6 non-volatile memory system 500 may include memory die command managers 506 that are each assigned to NAND die 0 to n (510-0 to 510-*n*) on a single channel (FIG. 5) or the non-volatile memory system 500 may include a single memory die command manager 506 that is assigned to all NAND die 0 to n (510-0 to 510-*n*) on all channels (FIG. 6). Each memory die command manger instance may handle data programming on a die-by-die level and each instance of the memory die command manager can select the best die on the single channel for a particular operation based on its availability.

In the memory system 500' illustrated in FIG. 6, where a single memory die command manager 506' manages all NAND die 0 to n (510-0 to 510-*n*) on one or many channels 504', the memory die command manager is the same type of module as the implementation with multiple memory die command managers of FIG. 5. For ease of illustration, and to avoid repetition, the features described below are generally explained in the context of the multiple memory die command manager arrangement of FIG. 5. It should be understood, however, that all of the features disclosed herein are equally applicable to the single memory die command manager embodiment of FIG. 6.

In some implementations, the memory die command manager 506 includes a die selection algorithm in which data programming parallelism and write transactions throughout the memory system are managed so that a delay in one bank of memory does not cause accumulation of host data commands in host command queues. Each memory die command manager 506 is associated with NAND die 0 to n (510-0 to 510-*n*) on only one channel 504. In this manner, multiple NAND die can operate fully in parallel when required. Additionally, the memory die command manager may perform actions for each set of NAND die 0 to n (510-0 to 510-*n*) it manages on the same channel to select the NAND die that is best suited for receiving the data, for example the NAND die having the shortest queue of data to be written. In the embodiment of FIG. 6, the single memory die command manager 506' manages all NAND die and all channels and can select any NAND die that is best suited for receiving data.

The die selection algorithm may provide reduced latency for execution of host commands and improved performance with workloads having irregular I/O size or mixed read/write characteristics.

As mentioned above, memory systems 500 may minimize the accumulation of host commands in a buffer 514 such as the RAM of the controller waiting for processing by a command manager 501 by assigning physical block addresses at any die in memory within the memory system that is free for processing of the command to logical address units that a host uses with host commands. By assigning physical block addresses at any die to logical address units rather than assigning a subset of physical address space at the memory system known as a bank exclusively to logical address units, host commands do not accumulate in the buffer waiting for a busy bank of memory to become idle.

The memory system 500 may utilize two or more storage address tables (SATs) in order to assign logical address units to physical address units at any die during operation. A first storage address table associates a physical block addresses at a specific die of memory with virtual logical block addresses and a second storage address table associates virtual logical block addresses with host logical block addresses.

Figure 7:
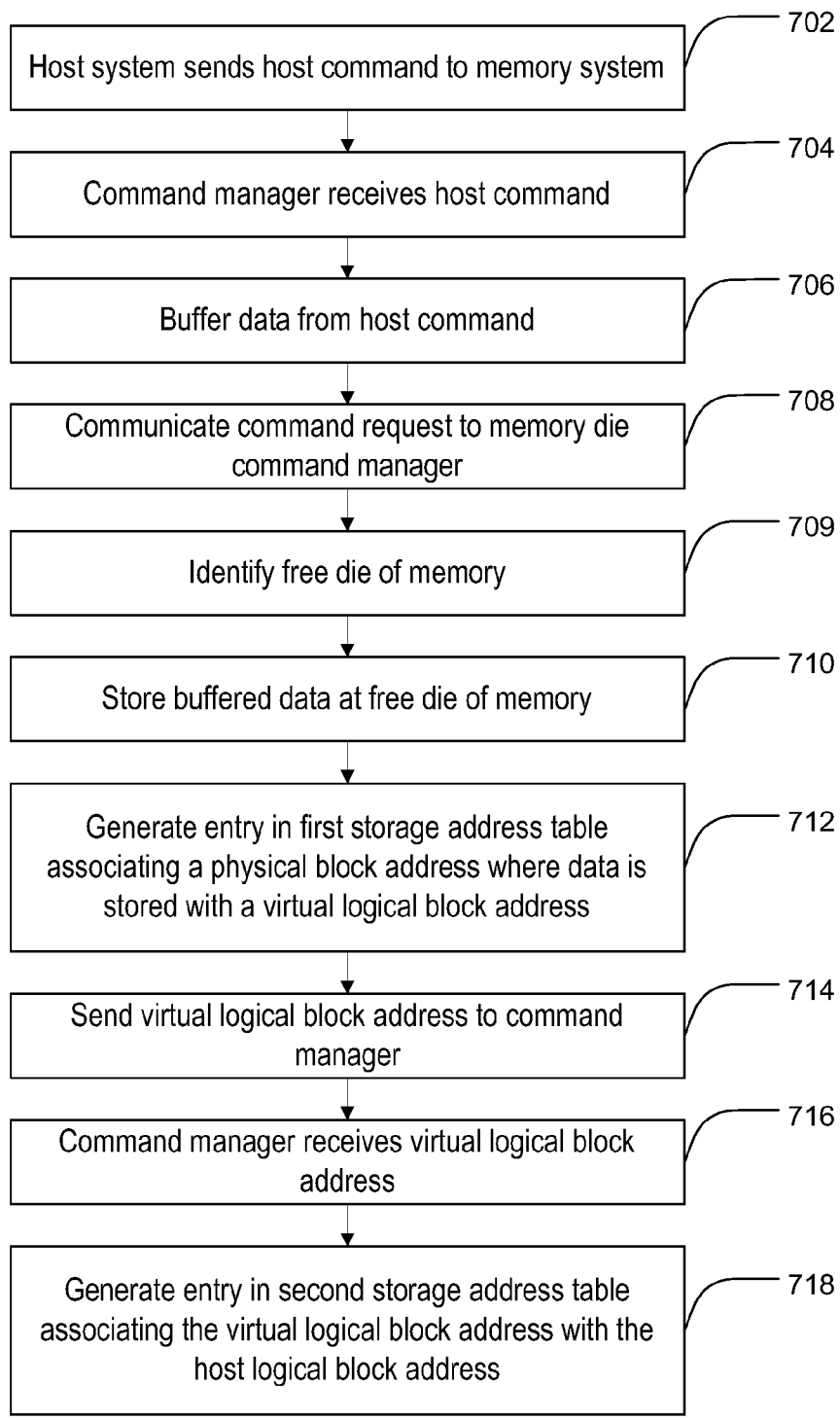
FIG. 7 is a flow chart of one implementation of a method for utilizing a die selection algorithm and storage address tables to store data from a host write command.

FIG. 7 is a flow chart of one implementation of a method for utilizing a die selection algorithm and storage address tables to minimize access blocking to a non-volatile memory system when storing data from a host write command. The method 700 begins at step 702 with a host system coupled to a memory system sending a host command, such as a host write command, to the memory system. As with the architectures described above, the memory system may include non-volatile memory, one or more memory die command managers in communication with the non-volatile memory, and a command manager in communication with the memory die command manager.

At step 704, a command manager receives the host write command, which is associated with data and a host logical block address. At step 706, the command manager buffers the data associated with the host write command in a buffer of the RAM of the memory system.

At step 708, the command manager communicates a command request to a memory die command manager that includes a size and a location of the buffered data. In some implementations, each memory die command manager periodically sends the command manager information regarding which memory banks are available to process a command. Using this information, the command manager communicates the command request to a memory die command manager at step 708 that is associated with a memory bank that is available to process the host write command independent of the host logical block address associated with the host command.

In some implementations, the command manager may communicate the command request to the memory die command manager soon after buffering the data associated with the host command. However, in other implementations, the command manager may wait to communicate the command request to the memory die command manager until an amount of overall data within the buffer exceeds a threshold. For example, the command manager may not communicate the command request until an amount of data stored in the buffer is sufficient to write a writable unit of data. In some implementations, this occurs when an amount of data stored in the buffer is equal to at least the amount of data that can be programmed in parallel within one die, which may be 32 kilobytes.

At step 709, the memory die command manager identifies a free die of memory within the memory system where the data may be stored. The memory die command manager may identify the free die based on factors such as whether the controller is currently performing an operation on a particular die of memory, an amount of free space at a particular die of memory, and/or any other factor that may indicate to the memory die command manager that it would be advantageous to write to one die of memory rather than another die of memory. It will be appreciated that the memory die command manager also identifies the free die of memory independent of the host logical block address associated with the host command.

At step 710, the memory die command manager stores the buffered data at a physical block address of the free die identified at step 709. The memory die command manager generates an entry in a first storage address table at step 712, where the entry contains an association between the physical block address of the free die where the data was stored and a virtual logical block address of the data. The memory die command manager selects the virtual logical block address to associate with the data based on virtual logical block addresses that are available within the free die identified at step 709.

At step 714, the memory die command manager communicates the virtual logical block address associated with the stored data to the command manager. At step 716, the command manager receives the information, and at step 718, the command manager generates an entry in a second storage address table. The entry in the second storage address table associates the virtual logical block address received at step 714 with the host logical block address received with the host write command at step 704.

Accordingly, after the above-recited method is completed, it will be appreciated that the memory system utilizes at least two levels of abstraction between the host logical block address of the data and the physical block address where the data is stored. A first storage address table utilized by the memory die command managers associates physical block addresses of die with virtual logical block addresses, while a second storage address table utilized by the command manager associates virtual logical block addresses with host logical block addresses. In some implementations, the virtual logical block address may include both a logical die address and a logical block address at the die. Similarly, the physical block address may include both a physical die address and a physical block address at the die.

By utilizing at least two levels of abstraction, a memory die command manager may perform operations such as garbage collection operations on memory blocks within a die without interrupting the command manager and without updating the storage address table utilized by the command manager that associates virtual logical block addresses with host logical block addresses. The memory die command manager would only need to update the storage address tables utilized by the memory die command manager that associates physical block addresses of die with virtual logical block addresses.

Additionally, it will be appreciated from the description above that utilizing at least two levels of abstraction allows the controller to store any address unit within logical block address space within any die of memory that is available, thereby preventing an accumulation of host commands with a buffer. Previously, an address unit within a logical block address space had to be stored within a specific die or a specific memory bank. Therefore, host commands would accumulate in a buffer as the command manager waited for a specific die to become idle.

Because the described memory systems utilize at least two levels of abstraction between the host logical block addresses and physical block addresses where data is stored, the same two or more storage addresses tables are used when reading data from the non-volatile memory system.

Figure 8:
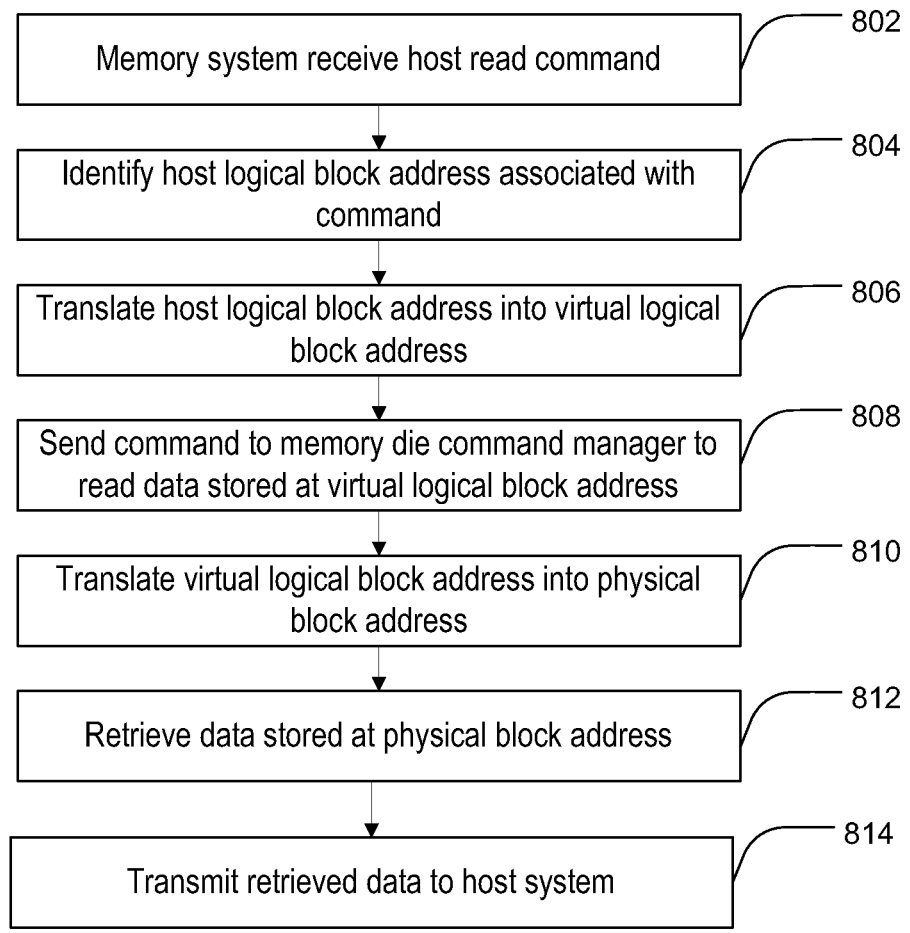
FIG. 8 is a flow chart of one implementation of a method for utilizing storage address tables such as those generated in the method of FIG. 7 to process host commands such as host read commands.

FIG. 8 is a flow chart of one implementation of a method for utilizing storage address tables such as those generated in the method of FIG. 7 to process host commands such as host read commands. The method begins at step 802 with a non-volatile memory system receiving a command such as a host read comment from a host system in communication with the memory system.

At step 804, a command manager identifies a host logical block address associated with the host read command. At step 806, the command manager translates the host logical block address into a virtual logical block address using a storage address table such as the storage address table described in conjunction with FIG. 7 that associates virtual logical block addresses with host logical block addresses.

At step 808, the command manager sends a command to a memory die command manager to read data stored at the virtual logical block address. At step 810, the memory die command manager translates the virtual logical block address into a physical die address and a physical block address of the die using a storage address table such as the storage address table described in conjunction with FIG. 7 that associates physical block addresses of die with virtual logical block addresses.

At step 812, the memory die command manager retrieves the data stored at the identified physical block address, and at step 814, the controller transmits the retrieved data to the host system.

FIGS. 1-8 and the accompanying descriptions above describe systems and methods for minimizing access blocking to a non-volatile memory system. The described memory systems may minimize blockage of host commands to memory systems by assigning physical address units at any die in memory within the memory system to logical address units that a host uses with host commands. By assigning physical address units at any die to logical address units rather than assigning a subset of physical address space at the memory systems exclusively to logical address units, host commands do not accumulate in buffers waiting for a busy bank of memory to become idle.

With the described memory systems, during operation, a command manager and memory die command managers may perform operations to store data at a die of the memory based on the availability of the die of memory. Because the command manager and memory die command managers may dynamically assign a physical block address at a specific die of memory to a virtual logical block address, the memory system may perform the storage operation more efficiently without waiting for a specific die to be come available.

It is intended that the foregoing detailed description be regarded as illustrative rather than limiting, and that it be understood that it is the following claims, including all equivalents, that are intended to define the spirit and scope of this invention.

For example, in the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

I claim:
1. A non-volatile memory system comprising:
 non-volatile memory comprising a plurality of die, wherein each die comprises a set of non-volatile memory cells and associated circuitry for managing a physical operation of the set of non-volatile memory cells and wherein the plurality of die is arranged into a plurality of channels of die;
a plurality of memory die command managers in communication with the non-volatile memory, wherein each memory die command manager is configured to manage a different channel of die of the plurality of channels of die, and wherein each memory die command manager is configured to:
identify, independent of a host logical block address associated with the data, a free die of the plurality of die of the channel of die managed by the memory die command manager that is idle and available to store data;
store the data at a physical block address at the free die; and
generate an entry in a first address table, the first address table associating the physical block address with a virtual logical block address; and
a command manager in communication with the plurality of memory die command managers, the command manager configured to generate an entry in a second address table, the second address table associating the virtual logical block address with a host logical block address received with a host write command.

2. The non-volatile memory system of claim 1, wherein the non-volatile memory comprises a silicon substrate and a plurality of memory cells forming at least two memory layers vertically disposed with respect to each other to form a monolithic three-dimensional structure, wherein at least one layer is vertically disposed with respect to the silicon substrate.

3. The non-volatile memory system of claim 2, wherein the command manager and the plurality of memory die command managers are on the same substrate as the memory cells.

4. The non-volatile memory system of claim 1, where the non-volatile memory system is embedded in a host.

5. The non-volatile memory system of claim 1, where the non-volatile memory system is removably connectable to a host.

6. The non-volatile memory system of claim 1, wherein the command manager is further configured to:
receive, from a host, the host write command with the associated data, the host write command associated with the host logical block address;
buffer the data;
determine that a sufficient amount of host data is stored in the buffer to complete the writeable unit; and
communicate a command request to a memory die command manager of the plurality of memory die command managers after determining that the sufficient amount of host data is stored in the buffer to complete a writeable unit, the command request comprising a size and a location of the buffered data.

7. The non-volatile memory system of claim 1, wherein the writeable unit is an amount of data that can be programmed in parallel within one die of memory.

8. The non-volatile memory system of claim 1, wherein each memory die command manager of the plurality of memory die command managers is further configured to adjust the entry in the first address table after performing a garbage collection operation such that a second physical block address for the free die is associated with the virtual logical block address, wherein the entry in the second address table associated with the virtual logical block address does not reflect a change in the physical block address associated with the virtual logical block address.

9. The non-volatile memory system of claim 1, wherein the command manager is further configured to translate a second host logical block address, received from a host in association with a host read command, to a second virtual logical block address, the second virtual logical block address comprising a logical die address and a logical block address at the die, and to send a command to a memory die command manager of the plurality of memory die command managers to read data stored at the second virtual logical block address; and
wherein the memory die command manager of the plurality of memory die command managers is further configured to translate the second virtual logical block address to a physical die address and a physical block address at the die of the non-volatile memory and retrieve the data stored at the second virtual logical block address.

10. The non-volatile memory system of claim 9, wherein the command manager is configured to translate the second host logical block address to the second virtual block address utilizing the second address table; and
wherein the memory die command manager of the plurality of memory die command managers is configured to translate the second virtual logical block address to the physical die address and the physical block at the physical die address utilizing the first address table.

11. A method for managing data, the method comprising:
in a non-volatile memory system comprising a non-volatile memory, a plurality of memory die command managers in operative communication with the non-volatile memory, and a command manager in operative communication with the plurality of memory die command managers, the non-volatile memory comprising a plurality of die arrange into a plurality of channels of die, wherein each channel of die is managed by a different memory die command manager of the plurality of memory die command managers and each die comprises a set of non-volatile memory cells and associated circuitry for managing a physical operation of the set of non-volatile memory cells:
receiving at the command manger a host write command with associated data, the host write command associated with a host logical block address;
buffering the data;
communicating a command request from the command manager to a memory die command manager of the plurality of memory die command managers, the command request comprising a size and a location of the buffered data;
identifying, with the memory die command manager of the plurality of memory die command managers, independent of a host logical block associated with the data, a free die of the plurality of die of the channel of die manage by the memory die command manager that is idle and available to store the data;
storing the buffered data at a physical block address at the free die;
generating an entry in a first address table, the first address table containing the physical block address associated with a virtual logical block address;
communicating the virtual logical block address to the command manager; and
generating an entry in a second address table, the entry in the second address table associating the virtual logical block address with the host logical block address.

12. The method of claim 11, further comprising:
determining that a sufficient amount of host data is stored in the buffer to complete the writeable unit;
wherein the command manager communicates the command request to the memory die command manager of the plurality of memory die command managers after determining that the sufficient amount of host data is stored in the buffer to complete a writeable unit.

13. The method of claim 11, further comprising:
adjusting the entry in the first address table after performing a garbage collection operation such that a second physical block address for the free die is associated with the virtual logical block address, wherein the entry in the second address table does not reflect a change in the physical block address associated with the virtual logical block address.

14. The method of claim 11, further comprising:
receiving at the command manager a host read command from the host, where the host read command is associated with a second host logical bock address;
translating, with the command manager, the second host logical block address to a second virtual logical block address, the second virtual logical block address comprising a logical die address and a logical block address at the die;
sending a command from the command manager to the memory die command manager of the plurality of memory die command managers to read data stored at the second virtual logical block address;
translating, with the memory die command manager of the plurality of memory die command managers, the second virtual logical block address to a physical die address and a physical block address at the die of the non-volatile memory;
retrieving the data stored at the second virtual logical block address; and
transmitting the data stored at the second virtual logical block address to the host.

15. The method of claim 14, wherein the command manager translates the second host logical block address to the second virtual block address utilizing the second address table; and
wherein the memory die command manager of the plurality of memory die command managers translates the second virtual logical block address to the physical die address and the physical block at the physical die address utilizing the first address table.

16. The method of claim 11, wherein the non-volatile memory comprises a silicon substrate and a plurality of memory cells forming at least two memory layers vertically disposed with respect to each other to form a monolithic three-dimensional structure, wherein at least one layer is vertically disposed with respect to the silicon substrate.

17. The method of claim 16, wherein the command manager and the plurality of memory die command managers are on the same substrate as the memory cells.

18. The method of claim 11, where the non-volatile memory system is embedded in the host.

19. A non-volatile memory system comprising:
non-volatile memory comprising a plurality of die, wherein each die comprises a set of non-volatile memory cells and associated circuitry for managing a physical operation of the set of non-volatile memory cells and where the set of the non-volatile memory cells and the associated circuitry for each die are formed on a single separate substrate and wherein the plurality of die is arranged into a plurality of channels of die;
a plurality of means for managing a channel of die, wherein each means for managing a channel of die manages a different channel of die of the plurality of channels of die, and wherein each means for managing a channel of die is further for:
identifying, independent of a host logical block address associated with the data, a free die of the plurality of die of a channel of die managed by the means for managing a channel of die that is idle and available to store data;
storing the data at a physical block address at the free die;
generating an entry in a first address table, the first address table associating a physical block address where the data is stored with a virtual logical block address; and
means for generating an entry in a second address table, the second address table associating the virtual logical block address with a host logical block address for the data received with a host write command.

20. The non-volatile memory system of claim 19, further comprising:
means for performing a garbage collection operation to store at least a portion of the data at a second physical block address at the memory die; and
means for updating the entry in the first address table to associate the second physical block address with the virtual logical block address, where the entry in the second address table associated with the virtual logical block address does not reflect a change in the physical block address associated with the virtual logical block address.

* * * * *